(12) United States Patent
Feng et al.

(10) Patent No.: US 11,292,316 B2
(45) Date of Patent: Apr. 5, 2022

(54) VEHICLE-MOUNTED GAS WATER HEATER

(71) Applicant: Zhongshan Powtek Appliances Mfg., Ltd, Guangdong (CN)

(72) Inventors: Xianwei Feng, Guangdong (CN); Qi Yang, Guangdong (CN); Zhiyuan Ma, Guangdong (CN)

(73) Assignee: Zhongshan Powtek Appliances Mfg., Ltd, Zhongshan (CN)

(*) Notice: Subject to any disclaimer, the term of this patent is extended or adjusted under 35 U.S.C. 154(b) by 517 days.

(21) Appl. No.: 16/248,774

(22) Filed: Jan. 16, 2019

(65) Prior Publication Data

US 2019/0241045 A1 Aug. 8, 2019

Related U.S. Application Data

(63) Continuation of application No. PCT/CN2018/075560, filed on Feb. 7, 2018.

(51) Int. Cl.
*B60H 1/22* (2006.01)
*B60N 3/00* (2006.01)

(52) U.S. Cl.
CPC ......... *B60H 1/2206* (2013.01); *B60H 1/2209* (2013.01); *B60N 3/00* (2013.01); *B60H 2001/224* (2013.01); *B60H 2001/2278* (2013.01)

(58) Field of Classification Search
USPC .................................................. 237/212.3 C
See application file for complete search history.

(56) References Cited

U.S. PATENT DOCUMENTS

| 2002/0124814 A1* | 9/2002 | Stretch | F23D 14/72 122/14.1 |
| 2017/0205115 A1* | 7/2017 | Ng | F23N 1/00 |
| 2019/0212033 A1* | 7/2019 | Consadori | B60H 1/2203 |
| 2020/0400344 A1* | 12/2020 | Consadori | F24H 9/2035 |

FOREIGN PATENT DOCUMENTS

| CN | 201382544 Y | 1/2010 |
| CN | 201434611 Y | 3/2010 |
| CN | 201875901 U | 6/2011 |
| CN | 105927978 A | 9/2016 |
| DE | 19645179 A1 | 5/1998 |

* cited by examiner

*Primary Examiner* — Steven B McAllister
*Assistant Examiner* — John E Bargero (57) ABSTRACT

Disclosed is a vehicle-mounted gas water heater, wherein the water flow pipe comprises a water inflow section, a first heating section, a second heating section and a water outflow section, wherein the water inflow section is shortened, wherein the water inflow section is shortened, a heating section is rapidly heated directly by the combustion heating device, and the second heating section is heated by winding on the heat exchanger, so that, formation of condensed water at the water inflow section is reduced due to reduction of surface area, condensed water formed on the surface of the first heating section is rapidly evaporated, and it is difficult for condensed water to form on the surfaces of the second heating section and the outflow section.

9 Claims, 7 Drawing Sheets

VEHICLE-MOUNTED GAS WATER HEATER

CROSS-REFERENCE TO RELATED APPLICATIONS

This application is a continuation of International Application No. PCT/CN2018/075560, filed on Feb. 7, 2018, which is hereby incorporated by reference in its entirety.

TECHNICAL FIELD

The present disclosure relates to the field of vehicle-mounted water heater, and in particular to a vehicle-mounted gas water heater.

BACKGROUND OF THE PRESENT INVENTION

Water heaters designed for home or commercial buildings are usually bulky, heavy, and not portable, and are not suitable for use in vehicles and ships where hot water is required, such as motorhomes, ambulances, fire engines, military vehicles, yachts, etc.

At present, vehicle-mounted water heater for vehicles and ships is classified into fuel water heater, electric water heater, gas water heater and solar water heater according to heat sources; among them, gas water heater is relatively environmentally friendly and/or energy-saving, easy to use, reliable and less costly compared with other types of water heater. Therefore, gas water heater is the main direction for the development of vehicle-mounted water heater in the future.

In the conventional vehicle-mounted gas water heater, the tube coil of the heat exchanger is generally a cold water tube coil, that is, a cold water tube wound around the heat exchanger case. This structure is particularly easy to form condensed water, and the formed condensed water is not easily volatilized and continuously accumulates. The accumulated condensed water will corrode the internal components of the water heater, affect the normal operation of the water heater, and cause dripping phenomenon of the water heater.

In case of a conventional vehicle-mounted gas water heater, on the one hand, there are situations that water is not hot enough in winter and overheated in summer, and that when the season changes in winter and summer, it is necessary to manually operate the water flow control valve; on the other hand, since the incoming water pressure of the vehicle-mounted gas-fired water heater varies from time to time, the water flow rate is not stable, resulting in a fluctuation on the actual temperature of the delivered water. It is often necessary to control the flow rate of water to ensure that the delivered water is at the desired temperature, which greatly increases inconvenience of use.

In case of a conventional vehicle-mounted gas water heater, the burner is generally an open type which exchanges gas with the atmosphere. Because the vehicle environment requires the water heater to be as small as possible, on the one hand, the outside air is difficult to smoothly enter the inside of the water heater, and on the other hand, the internal air flows irregularly and thus the fuel gas cannot be sufficiently mixed with air. As a result, combustion of the gas is insufficient, smoke index is high, and thermal efficiency is low. Formation and accumulation of condensed water is further promoted. Additionally, insufficient combustion of gas can produce carbon monoxide which can cause life danger. When it is necessary to increase the maximum heat load, merely increasing the heat load by expanding the gas nozzle without changing the size of the burner may lead to an even more insufficient combustion, the carbon monoxide content in the flue gas rises, and a yellow flame is generated. Due to the insufficient combustion of fuel gas, the existing vehicle-mounted gas water heater generally cannot supply hot water quickly and in large quantities. Due to the influence of the limited space of the vehicle environment on the volume of the burner, it is impossible to simply increase the dimension of the burner so as to increase the heat load and heat more water in the same amount of time.

In addition to the above deficiencies, the existing vehicle-mounted gas water heater has a complex structure, low utilization rate, is easily affected by the movement of the vehicle body and the hull, has a short service life, and has a high failure rate. As a result, it is not well suited for use with hard water, and for use in a situation when the water pipe in the exchanger is broken due to the expansion of water caused by icing in the pipe under a low ambient temperature. Therefore, it is necessary to improve the above deficiencies.

SUMMARY OF THE PRESENT INVENTION

In order to overcome the above-mentioned deficiencies of the prior art, the present disclosure provides a vehicle-mounted gas water heater capable of avoiding or at least to some extent avoiding the accumulation of condensed water. The present disclosure is realized by the following technical solutions: a vehicle-mounted gas water heater comprising a casing, a water delivering pipe, a heat exchanger, a combustion heating device, a smoke exhausting device, and a controller, the combustion heating device comprising a gas pipe, a gas valve, an ignition device and a burner, the water delivering pipe, from a water inlet to a water outlet, comprising a water inflow section, a first heating section, a second heating section and a water outflow section, wherein the water inflow section is shortened, wherein the water inflow section is shortened, the first heating section is rapidly heated directly by the combustion heating device, and the second heating section is heated by winding on the heat exchanger, so that during water flows in from the water inlet and flows out from the water outlet, formation of condensed water at the water inflow section is reduced, condensed water formed on the surface of the first heating section is rapidly evaporated, and it is difficult for condensed water to form on the surfaces of the second heating section and the outflow section.

Preferably, the vehicle-mounted gas water heater further comprises a gas mixing enhancing seat, the gas mixing enhancing seat comprising a port and a gas mixing enhancing chamber, wherein the burner and the ignition portion of the ignition device are located in the gas mixing enhancing chamber, the port is located adjacent to the burner for gas and air ingress, an upper portion of the gas mixing enhancing seat is connected to a lower portion of the heat exchanger, an upper portion of the heat exchanger is connected to the smoke exhausting device, so that the port, the gas mixing enhancing chamber, the combustion chamber of the heat exchanger, and the smoke exhausting passage of the smoke exhausting device are sequentially connected, and a gas flow passage is formed, the flow of gas is driven by the smoke exhausting device.

Preferably, the vehicle-mounted gas water heater further comprises a mechanical flow stabilizer, wherein the flow stabilizer is disposed in the water inflow section or the water outflow section for stabilizing water flow rate when water inflow pressure changes.

Preferably, the vehicle-mounted gas water heater further comprises a water flow rate regulating valve of a memory alloy type, wherein the water flow rate regulating valve is disposed in the water inflow section for automatically adjusting water flow rate in direct proportion to a change of water inflow temperature.

Preferably, the port comprises a gas vent and an air vent, the gas vent being located at a side of the gas mixing enhancing seat, the air vent being located at the bottom and/or side of the gas mixing enhancing seat.

Preferably, the vehicle-mounted gas water heater further comprises a temperature sensor electrically connected to the controller, the temperature sensor comprising an water inflow temperature sensor and/or an water outflow temperature sensor, the water inflow temperature sensor being disposed in the water inflow section, and the water outflow temperature sensor being disposed in the water outflow section.

Preferably, the gas valve is a gas proportional valve, the water delivering pipe comprises a water flow sensor, and the controller controls the gas proportional valve based on a temperature signal of the water inflow temperature sensor and/or the water outflow temperature sensor and a water flow rate signal of the water flow sensor, so that an input heat load of the water heater matches a current water inflow temperature and water flow rate to achieve or approach a setting value of an water outflow temperature.

Preferably, the vehicle-mounted gas water heater further comprises a filtering device for filtering air flowing in from an air inlet of the casing.

Preferably, the vehicle-mounted gas water heater further comprises a connecting wire and a wire controller, an end of the connecting wire is connected to the controller, another end of the connecting wire being drawn out from the casing and connected to the wire controller.

Preferably, the filtering device has a drainage structure for discharging water that has flowed in from the air inlet.

Preferably, the controller further comprises a programming interface for reprogramming the controller.

The water delivering pipe of the present disclosure effectively reduces the generation of condensed water, can avoid or at least to some extent avoid the accumulation of condensed water, and can reduce the formation of scale in the water delivering pipe, which is beneficial for prolonging the service life of the water heater, making the water heater safe and reliable. Through the setting of the gas mixing enhancing seat, the heat load of the burner can be increased without increasing the overall volume of the water heater, so that the combustion of the gas is more sufficient, more water can be heated in the same time, and the thermal efficiency is higher, which is the environmentally friendly. The setting of the mechanical stabilizer is favorable for stabilizing the water flow when the influent water pressure fluctuates, so that the control of the water outflow temperature is more accurate. The setting of the memory alloy water flow rate regulating valve automatically adjusts the water flow when the external temperature changes, so that regulation of water flow is more timely, efficient and accurate, and thus the control of the water outflow temperature is more accurate. Compared with the electronic type, the mechanical flow stabilizer or the memory alloy type water flow rate regulating valve is simpler and more reliable in structure, smoother in operation, lower in cost, can be well applied to the vehicle environment. Water yield is guaranteed, and at the same time, the actual temperature of the effluent can reach or approach the setting temperature of the effluent.

BRIEF DESCRIPTION OF THE DRAWINGS

The present disclosure will be further described in detail below with reference to the accompanying drawings and specific embodiments.

FIG. 3b is a partial view of FIG. 3a;

FIG. 5b is a partial view of FIG. 5a;

FIG. 5c is another partial view of FIG. 5a;

The reference numerals in the drawings correspond to the following, 1—flat lock, 2—face shell assembly, 3—decoration ring, 4—case flange cover, 5—fixing plate, 6—smoke exhausting device, 60—smoke inlet, 61—smoke intake shield, 62—connecting shield, 63—fixing plate, 64—smoke exhausting volute, 65—fan, 66—smoke exhausting pipe, 67—smoke outlet, 7—upper plate, 8—wind pressure switch, 9—lower plate, 10—heat exchanger, 101—combustion chamber, 11—outlet water temperature sensor, 12—over-temperature protection thermostat, 13—antifreeze thermostat, 14—water inflow pipe assembly, 140—water inlet, 141—water outlet, 15—burner, 151—gas mixing enhancing seat 151, 1511—gas vent, 1512—air vent, 152—harmonica three-rowed burner, 1521—mixing chamber, 16—ignition device, 17—water inflow temperature sensor, 18—water flow sensor, 19—pressure relief valve, 20—pressure relief drainage pipe, 21—gas intake pipe assembly, 210—gas inlet, 22—connecting pipe, 23—gas proportional valve, 24—controller, 25—switch, 26—insurance tube, 27—dust-proof net, 270—main air inlet, 28—wire controller, 281—wire controller seat, 29—wire hole.

DETAILED DESCRIPTION OF THE PRESENT DISCLOSURE

The present disclosure is further described below in conjunction with the drawings and embodiments.

Figure 1:
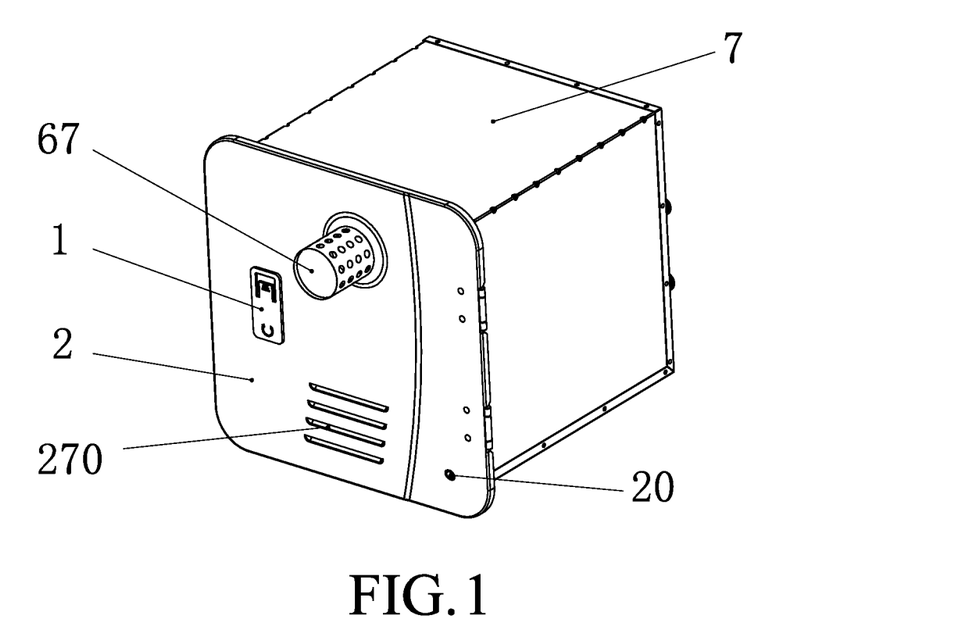
FIG. 1 is a first schematic view of an embodiment of the present disclosure.
Figure 2:
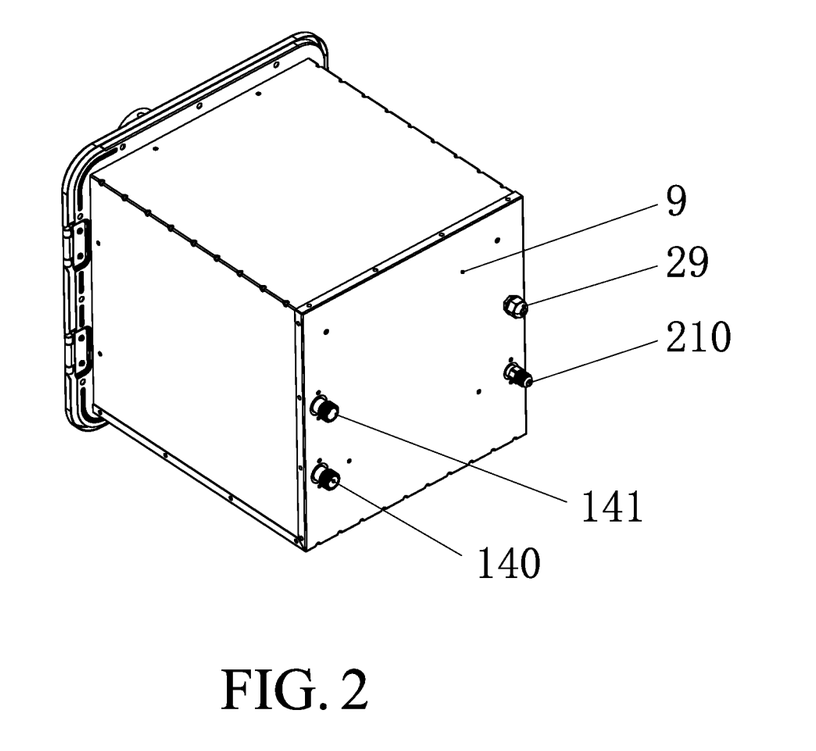
FIG. 2 is a second schematic view of an embodiment of the present disclosure.
Figure 3A:
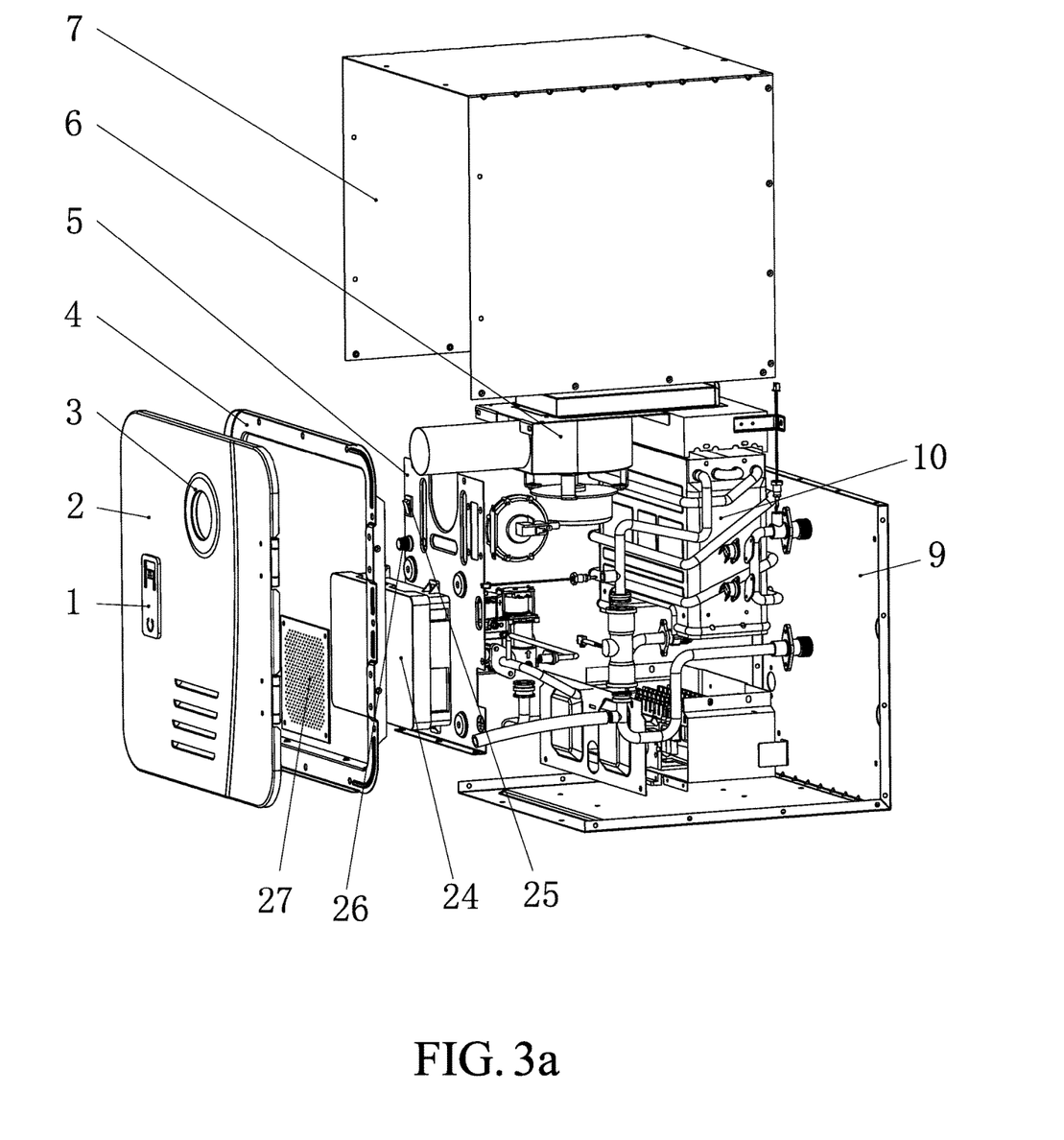
FIG. 3a is a s schematic view of a disassembled state of an embodiment of the present disclosure.
Figure 3B:
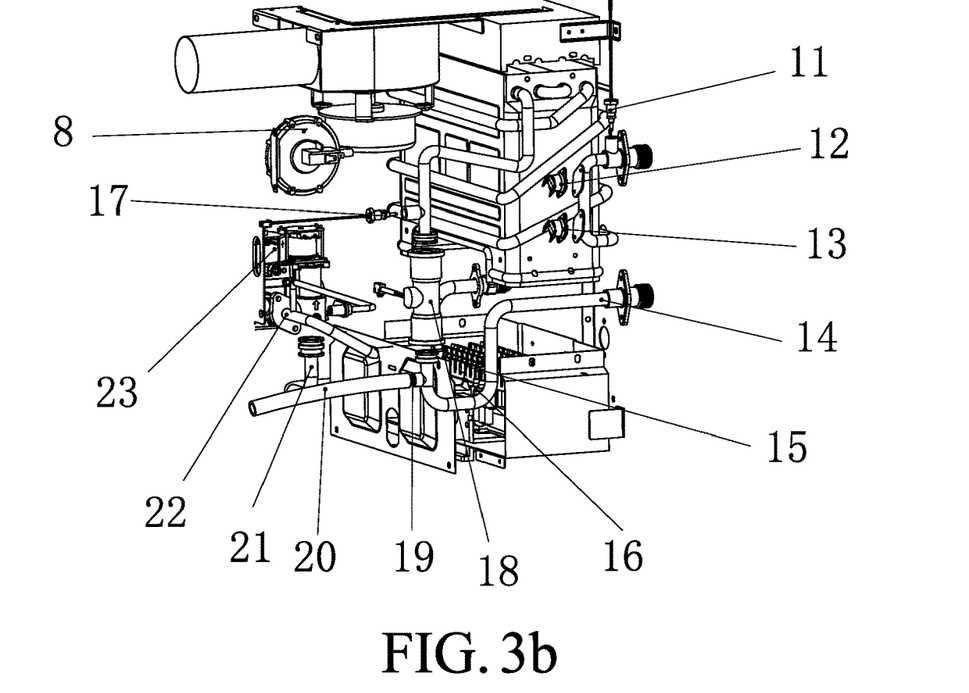

The vehicle-mounted gas water heater of this embodiment, as shown in FIG. 1-3, includes a casing, a water delivering pipe, a heat exchanger 10, a combustion heating device, a smoke exhausting device 6, and a controller 24, the combustion heating device comprising a gas pipe, a gas valve, an ignition device 16 and a burner 15.

The gas pipe includes a gas intake pipe assembly 21 and a connecting pipe 22. A gas valve is preferably a gas proportional valve 23, and the gas proportional valve 23 is disposed on the gas pipe and is connected to the controller 24. A gas inlet 210 of the gas pipe is located outside the casing. In use, the controller 24 issues an instruction to open the gas proportional valve 23. As a result, the gas flows in from the gas inlet 210, passes through the gas intake pipe assembly 21, the gas proportional valve 23, and the connecting pipe 22, and then flows to the burner 15.

Figure 6:
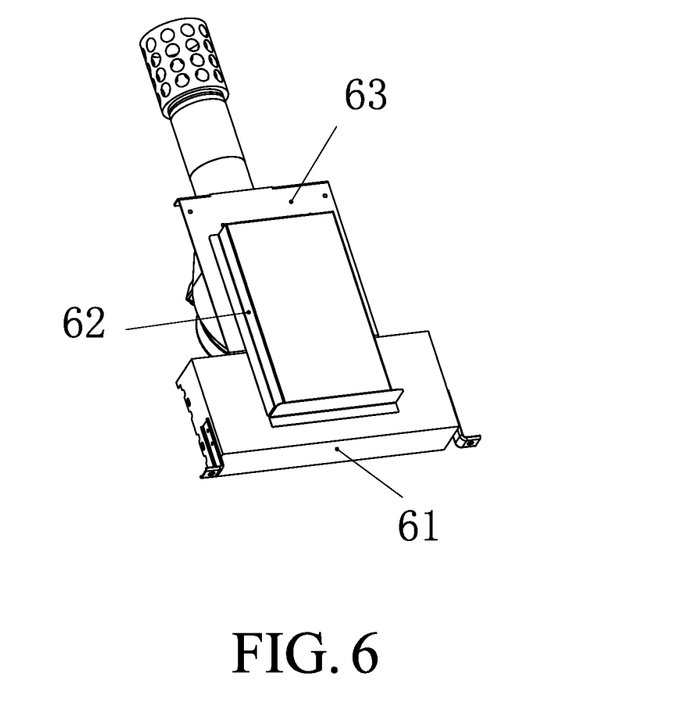
FIG. 6 is a schematic view of the smoke exhausting device of FIG. 5.

The casing is provided with main air inlets 270, and the smoke outlet 67 is located outside the casing. Referring to FIG. 1 and FIG. 6, in the present embodiment, the smoke exhausting device 6 preferably includes a smoke intake shield 61, a connecting shield 62, a fixing plate 63, a smoke exhausting volute 64, a fan 65 and a smoke exhausting pipe 66. The smoke intake shield 61 includes a smoke inlet 60, the smoke intake shield 61, the connecting shield 62, and the exhaust volute 64 are all fixed to the fixing plate 63. The connecting shield 62 and the fixing plate 63 form an air flow passage communicating the smoke inlet 60 and the smoke exhausting volute 64. The fan 65 is fixed externally to the smoke exhausting volute 64, and the fan 65 is located in the smoke exhausting volute 64. An end of the smoke exhausting pipe 66 is fixed to a side opening of the smoke exhausting volute 64, and another end of the smoke exhausting pipe 66 is a smoke exhaust port 67 extending outside the casing. In use, the smoke intake shield 61 is disposed on the combustion chamber 101 of the heat exchanger 10, and the controller 24 is used to issue an instruction to activate or deactivate the fan 65.

The water delivering pipe includes a water inlet pipe assembly 14 and a water body monitoring device. The water body monitoring device is disposed on the water delivering pipe and connected to the controller 24 for monitoring the water flow signal of the water body. The controller 24 determines, according to the signal, whether to issue an instruction to control the gas proportional valve 23, the ignition device 16, and the smoke exhausting device 6. The water flow monitoring device is preferably a water flow sensor 18, the water inlet 140 and the water outlet 141 of the water delivering pipe is located outside the casing, and the water delivering pipe preferably is winded on the heat exchanger 10.

In use, the water outlet of the water container is connected with the water inlet 140, the water inlet of the water outlet switch is connected with the water inlet 140, the air inlet 210 is connected with the gas container, the power is turned on, and the water heater is in a standby state. When water is needed, water body flows in from the water inlet 140 under the water pressure provided by the water container, and flows out from the water outlet 141. The controller 24 controls the ignition device 16 to ignite according to the water flow signal monitored by the water flow sensor 18, and opens the gas proportional valve 23. The gas flowing through the burner 15 is ignited by the ignition device 16 to heat the heat exchanger 10, and the smoke exhausting device 6 is controlled to operate to exhaust smoke. The outside air enters the casing through the main air inlet 270, and heat exchange occurs between the water delivering pipe and the heat exchanger 10 to heat the water flowing through the water delivering pipe. When closed, the controller 24 may turn off the gas proportional valve 23 and the smoke exhausting device 6 according to the water flow signal or the water temperature signal monitored by the water flow sensor 18.

In some embodiments, based on the above embodiment, as shown in FIG. 3, the water inflow section of the water delivering pipe is preferably provided with an water inflow temperature sensor 17. The water inflow temperature sensor 17 is electrically connected to the controller 24, and the controller 24 is connected to the power supply circuit. The controller 24 can issue a control instruction based on the water inlet temperature signal of the water delivering pipe.

In some embodiments, based on the above embodiment, as shown in FIG. 3, the water outflow section of the water delivering pipe is preferably provided with an water outflow temperature sensor 11, and the water outflow temperature sensor 11 is electrically connected to the controller 24. The controller 24 can issue a control instruction based on the water temperature signal of the water delivering pipe.

Arrangement of the water inflow temperature sensor 17 and the water outflow temperature sensor 11 enables the controller 24 to intelligently control the opening extent of the gas proportional valve 23 in real time according to the water inflow and/or the water outflow temperature during operation of the device, further ensuring that the water outflow temperature reaches a setting temperature. In a specific implementation, preferably, the controller 24 controls the gas proportional valve 23 according to the temperature signal of the water inflow temperature sensor 17 and/or the water outflow temperature sensor 11 and the water flow signal of the water flow sensor 18, so that the actual water outlet temperature of the water heater reaches or approaches a setting value of the water outflow temperature. The setting value of the water outflow temperature can be a fixed setting value or a setting temperature range. The structure can also be used to prevent the water body from freezing in the water delivering pipe due to low temperature. For example, when the water temperature is lower than $6 \pm 1°$ C., the water heater is started and heated for 5 s and then stops heating, or the water heater stops when the water temperature reaches $32 \pm 1°$ C. within 2 s. After the heating is stopped, wait for 3 minutes for the water heater self-test to repeat the above steps, etc.

Figure 4:
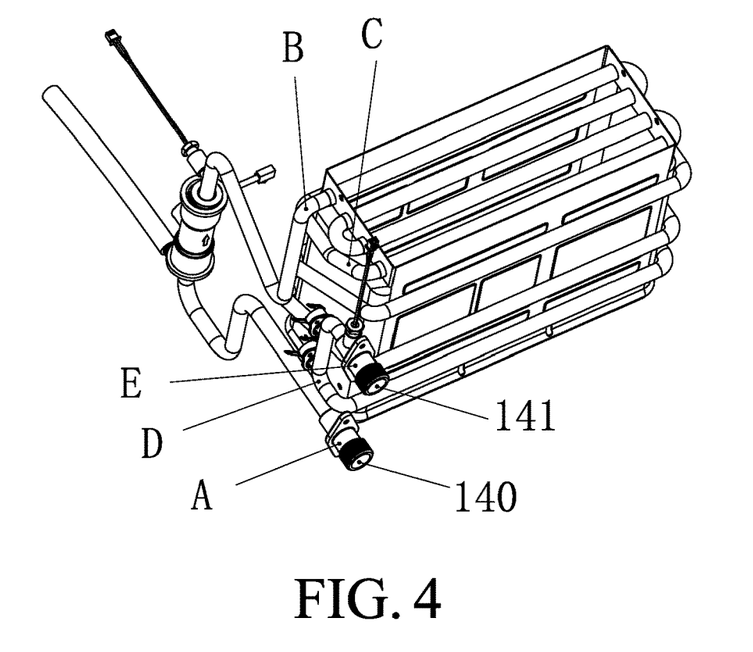
FIG. 4 is a schematic view of a water delivering pipe of an embodiment of the present disclosure.

In some embodiments, based on the above embodiments, as shown in FIG. 4, the water delivering pipe includes, along its water inlet 140 to its water outlet 141, a water inflow section AB, a first heating section BC, a second heating section CD and a water outflow section DE. The water inflow section AB is shortened, the first heating section BC is rapidly heated by the combustion heating device, and the second heating section CD is heated by winding on the heat exchanger 10, so that when the water body flows in from the water inlet 140 and out from the water outlet 141, condensed water formed on the water inflow section AB is reduced due to a decrease in surface area, condensed water formed on the surface of the first heating section BC is rapidly evaporated, and condensed water is difficult to be formed on the surfaces of the second heating section CD and the water outflow section DE. The structure can also greatly reduce the activity of calcium ions, magnesium ions, sulfate ions, nitrate ions and chloride ions in the water body, reduce the chemical reaction of various substances and copper materials, and prolong the service life of the heat exchanger 10 of the water heater. This structure is particularly suitable for use in areas with high chlorine and high hard water quality.

In the specific implementation, the formation of condensed water is related to the temperature and humidity of the water vapor. Since the water inflow section AB will lose heat due to the continuous flow of the water body, the length of the water inflow section AB in the casing should be shortened as much as possible to reduce the contact surface area of the high-temperature water vapor with the low-temperature water inflow section AB. Of course, it is also possible to reduce the contact surface area in a manner in which the diameter of the water inflow section AB is reduced, to achieve an equivalent effect. Since the first heating section BC is directly heated by the combustion heating device, the water flowing through the first heating section BC is rapidly heated, so that the condensed water formed on the surface of the first heating section BC can be quickly evaporated. The first heating section BC is preferably arranged on the upper portion of the combustion chamber 101 of the heat exchanger 10, or it can also be arranged in a rapid temperature rising zone which serves the same effect. Since the water body flowing through the second heating section CD has been heated in the first heating section BC, the surface temperature of the second heating section CD is correspondingly increased, and is further heated due to heat exchange with the heat exchanger 10. Therefore, it is difficult for condensed water to be formed on the surface of the second heating section CD, and accordingly, it is even more difficult for condensed water to be formed on the surface of the outflow section DE. Since the lengths of the second heating section CD and the water outflow section DE in the casing are long, the surface areas thereof are large, so that the temperature in the casing is correspondingly increased, and the evaporation of the condensed water on the water inflow section AB and other components in the casing is further facilitated. Correspondingly, the water inflow section AB preferably is adjacent to the second heating section CD and/or the water outflow section DE to further facilitate evaporation of the condensed water.

Figure 5A:
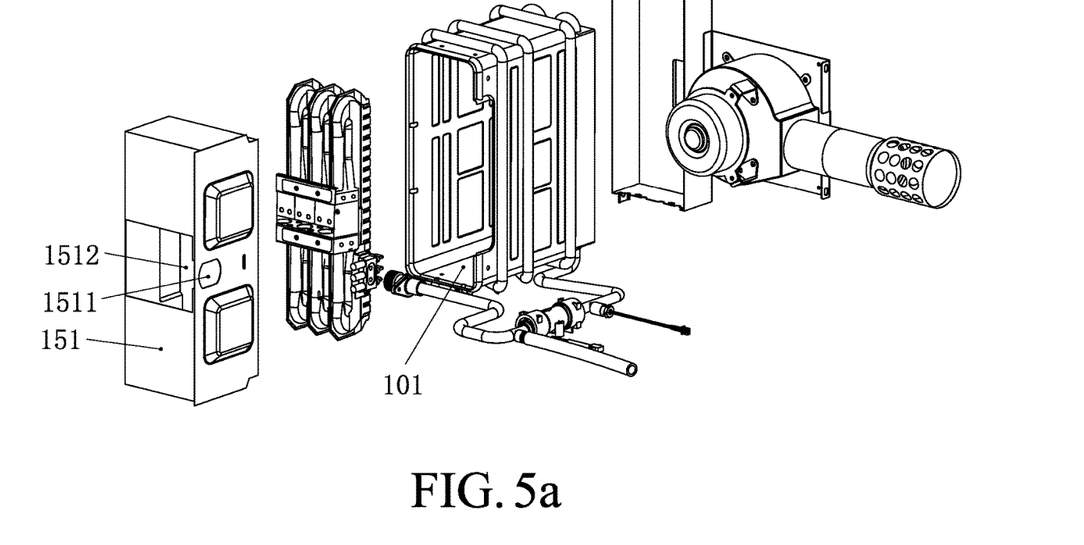
FIG. 5a is a schematic view of an air flow passage of an embodiment of the present disclosure.
Figure 5B:
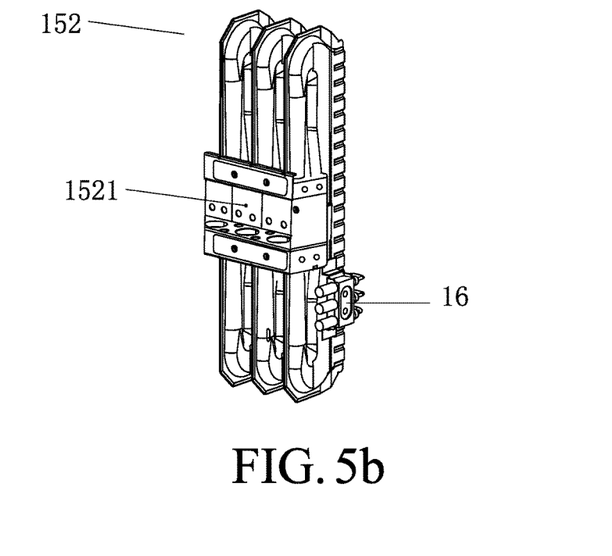
Figure 5C:
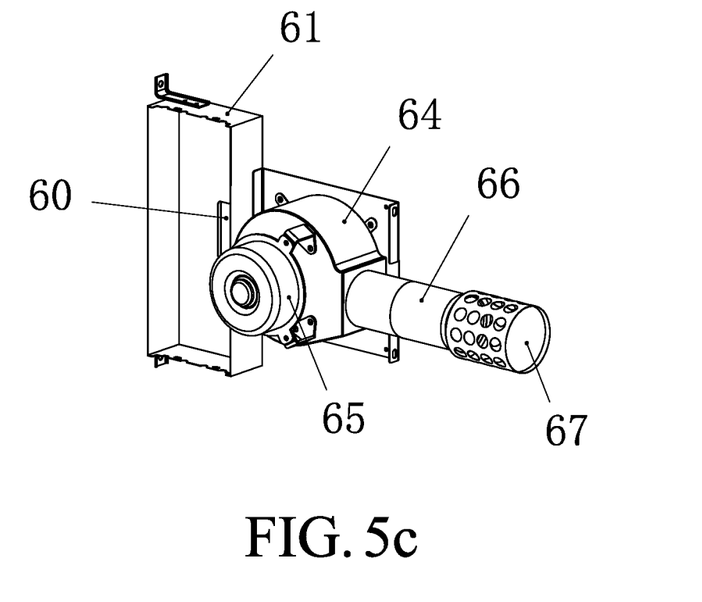

In some embodiments, based on the above-described embodiments, together with reference to FIG. 5 and FIG. 6, it is preferable for the water heater to further include a gas mixing enhancing seat 151 including a gas mixing enhancing chamber and a port. The burner 15 and the ignition portion of the ignition device 16 are located in the gas mixing enhancing chamber, the upper portion of the gas mixing enhancing seat 151 is connected to the lower portion of the heat exchanger 10, and the upper portion of the heat exchanger 10 is connected to the smoke exhausting device 6, so that the port, the gas mixing enhancing chamber, the combustion chamber 101 of the heat exchanger 10, and the smoke exhausting passage of the smoke exhausting device 6 are sequentially connected to form an air flow passage driven by the smoke exhausting device 6. The port is located adjacent to the burner 15 for gas and air ingress. In this structure, since the upper portion of the gas mixing enhancing seat 151 is connected to the lower portion of the heat exchanger 10, and the smoke intake shield 61 is disposed over the combustion chamber 101 of the heat exchanger 10. When the fan 65 is activated, a certain degree of negative pressure for sucking in air and gas required for combustion is generated in the air flow passage[[.]], so that the air flow originally used only for smoke exhausting and air replenishing has a combustion-supporting function, and so that more air is involved in the combustion. Since the port is located adjacent to the burner 15, gas and air are mixed and burned more sufficiently. Accordingly, the yellow flame is eliminated, and the carbon monoxide content in the flue gas is also greatly reduced. Heat efficiency of the device is increased without increasing the size of the burner 15 or the water heater, the heat load of the burner 15 is increased, and hot water can be supplied in a large amount quickly.

In a specific implementation, the gas mixing enhancing chamber of the gas mixing enhancing seat 151 is preferably surrounded by detachable plates to form a structure with an open top and a cavity-like chamber. The gas mixing enhancing seat 151 is fixed in the casing, and the heat exchanger 10 is preferably clamped to an upper part of the gas mixing enhancing seat 151. The burner 15 can be selected as a single-row, two-row or multi-row burner of harmonica shape. This embodiment is preferably implemented in the form of a three-row burner of harmonica shape 152. The ignition portion of the ignition device 16 is fixed on the burner 15, and it is preferably an ignition needle. The port preferably includes a gas vent 1511 and an air vent 1512. The gas vent 1511 is preferably located at a side of the gas mixing enhancing seat 151 adjacent to the gas end of the connecting pipe 22, and adjacent to the mixing chamber 1521 of the burner 15, and the air vent 1512 is preferably located at a side of the bottom and/or the periphery of the gas mixing enhancing seat.

Figure 7:
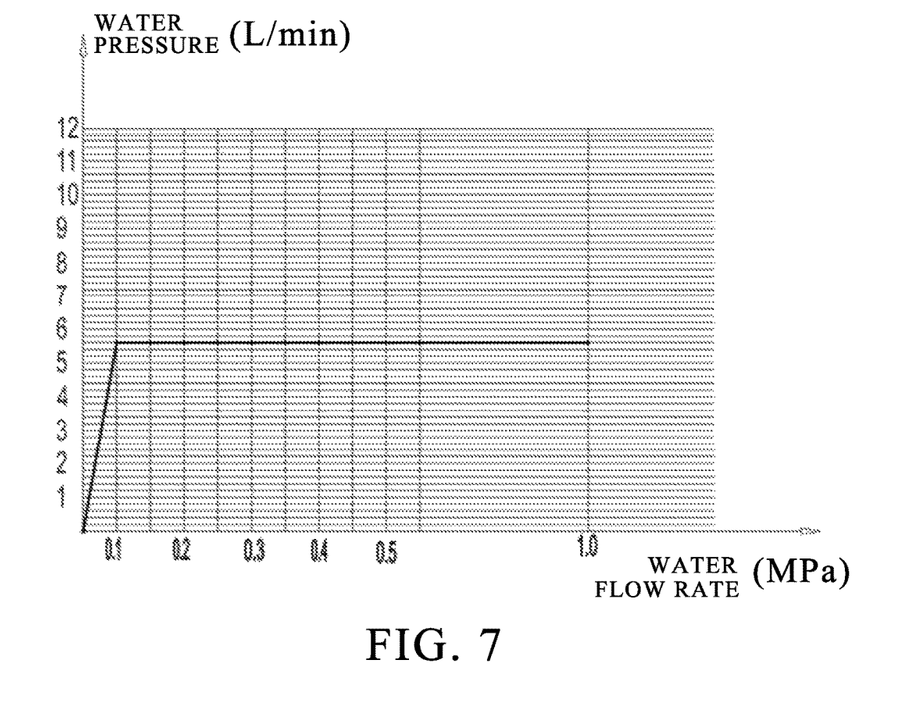
FIG. 7 is a water flow characteristic curve of a flow stabilizer of an embodiment of the present disclosure.

In some embodiments, based on the above embodiments, referring to FIG. 7, it is preferable for the water heater to further include a mechanical flow stabilizer, which is disposed in the water delivering pipe, preferably in the water inflow section or the water outflow section, for stabilizing water flow when the water inflow pressure changes. As an embodiment of the flow stabilizer, the mechanical flow stabilizer can maintain the water flow rate of the water delivering pipe within a range of ±10% of the rated flow rate under the pressure of the water inflow pressure of 0.1 MPA to 1.0 MPA, so as to stabilize the flow of water. Since the water inflow pressure is in a dynamic state when the water heater is in use, the arrangement of the flow stabilizer not only replaces the inadvertent flow rate manual regulating valve, but also does not need to control the water outflow rate at the water outlet end, and can be applied to a larger range of water pressure fluctuation. This is advantageous to ensure that the water outflow temperature reaches the setting temperature. The mechanical flow stabilizer has simpler and more reliable structure, smoother operation and lower cost than the electronic stabilizer.

Figure 8:
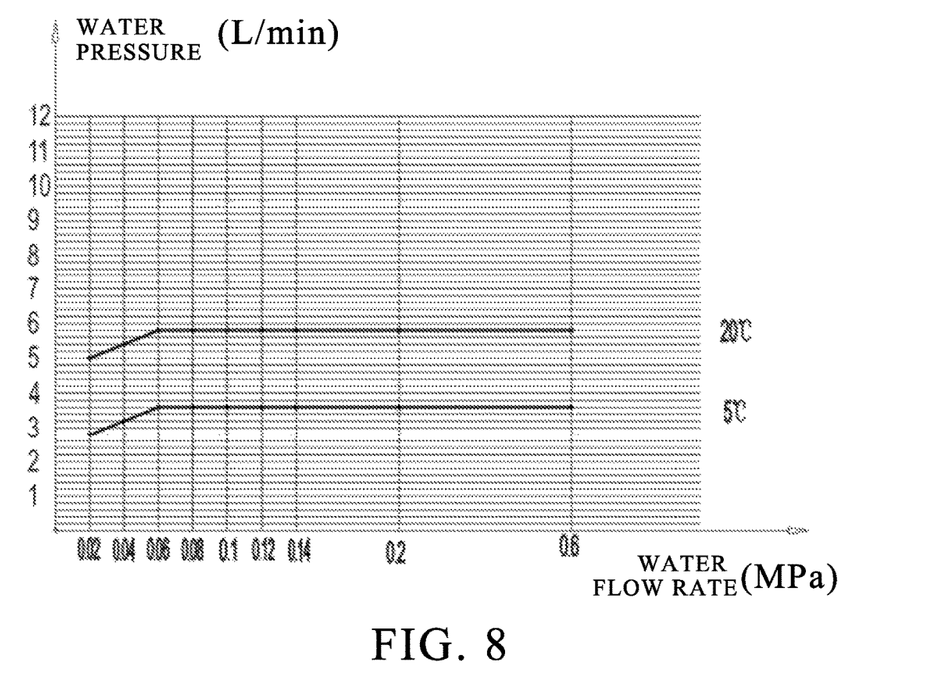
FIG. 8 is a water flow characteristic curve of a memory alloy type water flow rate regulating valve of an embodiment of the present disclosure.

In some embodiments, based on the above embodiment, with reference to FIG. 8, it is preferable for the water heater to further include a water flow rate regulating valve of a memory alloy type, and the water flow rate regulating valve is disposed in the water inflow section for automatically adjusting water flow rate in direct proportion to a change of water inflow temperature. As an embodiment of the water flow rate regulating valve, the water flow rate regulating valve is preferably installed in the water flow sensor 18. At a water inlet pressure of 0.06 MPA to 0.6 MPA, when the water inflow temperature is low, the water flow rate regulating valve can reduce the water flow rate, and when the water inflow temperature is high, it can increase the water flow rate. When the temperature is constant, the water flow rate is stabilized. The water flow rate is automatically adjusted in direct proportion to a change of water inflow temperature. The structure facilitates the control of the components by the controller 24, avoids frequent start and stop of various components, which is suitable for adapting to external temperature changes. The memory alloy type water flow rate regulating valve is mechanical and does not need to be electrically connected to the controller 24. Not only that the inconvenient inlet flow manual regulating valve is replaced, but also it is not required to control the water flow at the outlet end. Compared to the electronic water flow, the regulating valve has a simple and reliable structure, smooth operation and low cost.

In some embodiments, based on the above embodiment, as shown in FIG. 3, the device preferably further comprises a fixing plate 5 which is fixed in the casing and divides the chamber in the casing into an electronically controlled chamber and operating chamber. The controller 24 is located in the electronic controlled chamber and is fixed on the fixed plate 5. The heat exchanger 10, the ignition device 16, the burner 15, and the water delivering pipe and the gas line located in the casing are located in the operating chamber. The structure makes the operating environment of the controller 24 safer, facilitates the normal long-term use of the controller 24, and has better electrical insulation, which is beneficial to the safe use of the water heater. The controller 24 preferably includes a protective case in which the main control chip of the controller 24 is mounted.

Figure 9:
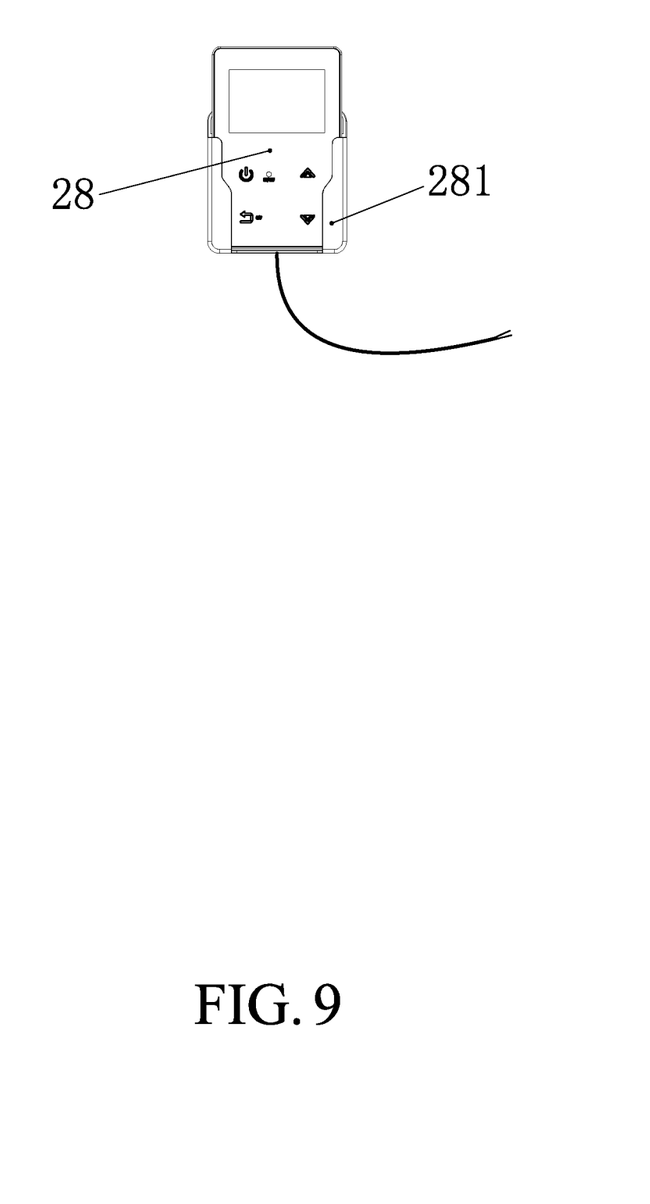
FIG. 9 is a schematic view of a wire controller of an embodiment of the present disclosure.

In some embodiments, based on the above embodiments, as shown in FIG. 9 together, it is preferable for the water heater to further include a connecting line. An end of the connecting line is connected to the controller 24, and another end of the connecting line is drawn out from the casing through the wire hole 29 and connected to the wire controller 28. The wire controller 28 can be placed at the wire controller seat 281. The mounting position of the wire controller seat 281 can be selected autonomously. The wire controller 28 can be used for display and control, for example, it is used for displaying water inflow temperature and/or water outflow temperature of the water delivering pipe, indicating the working state of the fan 65 and the burner 15, controlling the switch of the water heater, setting the water temperature setting value, switching the temperature display unit (Celsius/Fahrenheit), and can also be used for fault alarm, display fault code, etc. Arrangement of the wire controller 28 makes the wire easier to find and avoids lost thereof, achieves remote control of the water heater, making the use and control of the water heater more convenient, which is especially for use in the vehicle sports environment.

The controller 24 preferably further includes a burning interface. The burning interface can be used to reprogram the controller, and can upgrade or replace the corresponding control program, which is higher applicable. This structure facilitates the control of the controller 24 to be compatible with the varied performance of the water heater due to the age of use, and thus the matching degree is higher.

When the casing is specifically implemented, it preferably includes a face shell assembly 2, an upper plate 7 and a lower plate 9. The face shell assembly 2 includes a shell plate, the upper plate 7 has a U shape, and the lower plate 9 has an L shape. The plate 7 and the lower plate 9 are fixed to form an open case structure, and the shell plate covers the open portion of the case structure. The shell plate includes a main air inlet 270, that is, an air inlet. A filtering device is provided between the shell plate and the case structure for filtering the air flowing in from the main air inlet 270. The structure of the upper plate 7 and the lower plate 9 facilitates maintenance of the water heater. During maintenance, only the upper plate 7 is necessary to be removed to repair and maintain various components. The structure is simple and portable, has long service life, high safety and reliability, which is especially suitable for vehicle use environment.

When the filtering device is specifically implemented, it can be implemented as a case flange cover 4. In this manner, the shell plate can be fixed to the case flange cover 4 through a hinge, and the case flange cover 4 covers the open portion of the case structure. A filter vent area formed by a plurality of through holes is disposed on the case flange cover 4, and the dustproof net 27 is disposed adjacent to the filter vent area and detachably fixed to the case flange cover 4, to filter the air flowing into the case. Due to the flange structure of the case flange cover 4, water floating in from the main air inlet 270 can be discharged from the bottom of the filter device, and thus water is prevented from entering the case, so that the case and the combustion chamber are kept clean and rusting is avoided.

When the filtering device is specifically implemented, the dustproof net may be disposed on the inner side of the outer shell plate adjacent to the main air inlet 270, and the dustproof net is fixed by a detachable fixing device. The fixing device may collect water floating in from the main air inlet 270 discharge it from the lowest grid of the main air inlet 270. The environment in which the vehicle-mounted water heater is used is complicated, and the setting of the filtering device can prevent the dust from being sucked into the combustion chamber and affect the performance of the water heater, and can avoid the phenomenon that the dust is concentrated to a certain extent that ignition may not be completed and can avoid corrosion inside the water heater caused by the rain and snow floating in.

The shell plate of the above-mentioned face shell assembly 2 is provided with a smoke exhaust opening that cooperates with the smoke exhausting pipe 66, a drain opening that cooperates with the pressure relief drainage pipe 20, and a lock mounting port that cooperates with the flat lock 1. Preferably, a decoration ring 3 is disposed at the smoke exhausting opening, and the decoration ring 3 is respectively sealed at the contact portion of the smoke exhausting pipe 66 and the shell casing to facilitate smooth discharge of smoke and avoid mutual interference with the inflow air. One end of the pressure relief drainage pipe 20 protrudes from the drainage opening, and the other end thereof is connected to the pressure relief valve 19. The pressure relief valve 19 is installed on the water delivering pipe adjacent to the lowest point of the water delivering pipe. The controller 24 controls opening and closing of the pressure relief valve 19 for discharging the water body in the water delivering pipe. Preferably, the wire controller 28 can also control the opening and closing of the pressure relief valve 19. The purpose of the pressure relief valve 19 drainage may include pressure relief drainage and antifreeze drainage, and the controller 24 may control the opening and closing of related components according to different purposes. The flat lock 1 is preferably implemented as a zinc lock mode, which can effectively prevent corrosion to the door lock by the sun and rain. When it is opened, the operation is simple and the plug type is opened; when closed, the door lock is reliable when closed, and can effectively prevent loosing and falling of the lock; the door lock is also environmentally friendly, can be reused, and is durable, easy to disassemble and suitable for the vehicle environment.

When the smoke exhausting device 6 is specifically implemented, it preferably further includes a wind pressure switch 8 and a flame detecting device. The controller 24 comprehensively controls the fan 65 and the gas valve of the smoke exhausting device 6 according to the signals of the air pressure switch 8 and the flame detecting device, which ensures safety and improves energy efficiency.

In some embodiments, based on the above embodiments, as shown in FIG. 3, preferably, the controller 24 is further provided with a switch 25 and a insurance tube 26 on the circuit connected to the power source. The insurance tube 26 includes a fuse, and the specification of the fuse is preferably 125V-10 A. The structure can further ensure the safe use of the water heater, is suitable for the vehicle power environment, and is more reliable and safer.

In some embodiments, based on the above embodiment, as shown in FIG. 3, it is preferable for the water heater to further include an overtemperature protection thermostat 12 and an anti-freeze thermostat 13. The overtemperature protection thermostat 12 and the anti-freeze thermostat 13 are installed in series in the water outflow section of the water delivering pipe. The controller 24 preferably also issues an instruction to control the gas proportional valve 23, the ignition device, and the smoke exhausting device, that is, to control the start and stop of the water heater, according to the feedback signal from the overtemperature protection thermostat 12 and the antifreeze thermostat 13.

It is to be understood that those skilled in the art will be able to make modifications and changes in accordance with the above description, and all such modifications and variations are intended to be included within the scope of the appended claims.

The present disclosure has been exemplarily described above, and it is obvious that the implementation of the present disclosure is not limited to the above embodiments. As long as various improvements are made based on the method concept and technical solution of the present disclosure, or the concept and technical solution of the patent are directly applicable to other occasions without any improvement thereto, they are all within the protection scope of the present disclosure.

What is claimed is:

1. A vehicle-mounted gas water heater comprising a casing, a water delivering pipe, a heat exchanger, a combustion heating device, a smoke exhausting device, and a controller, the combustion heating device comprising a gas pipe, a gas valve, an ignition device and a burner, the water delivering pipe comprising a water inflow section, a first heating section, a second heating section and a water outflow section connected sequentially along a water inlet to a water outlet of the water delivering pipe, the first heating section is rapidly heated directly by the combustion heating device, and the second heating section is formed by winding the water flow pipe around an exterior of the heat exchanger, so that when a water body flows in from the water inlet and flows out from the water outlet, formation of condensed water at the water inflow section is reduced, condensed water formed on the surface of the first heating section is rapidly evaporated, and there is no condensed water formed on the surfaces of the second heating section and the outflow section.

2. The vehicle-mounted gas water heater according to claim 1, further comprising a gas mixing enhancing device, the gas mixing enhancing device comprising a port and a gas mixing enhancing chamber, wherein the burner and the ignition portion of the ignition device are located in the gas mixing enhancing chamber, the port is located adjacent to the burner for gas and air ingress, an upper portion of the rectifying seat is connected to a lower portion of the heat exchanger, an upper portion of the heat exchanger is connected to the smoke exhausting device, so that the port, the gas mixing enhancing chamber, the combustion chamber of the heat exchanger, and the smoke exhausting passage of the smoke exhausting device are sequentially connected, and an air flow passage is formed that is driven by the smoke exhausting device.

3. The vehicle-mounted gas water heater according to claim 1, further comprising a mechanical flow stabilizer, wherein the flow stabilizer is disposed in the water inflow section or the water outflow section for stabilizing water flow rate when water inflow pressure changes.

4. The vehicle-mounted gas water heater according to claim 1, further comprising:
a temperature sensor electrically connected to the controller, wherein the temperature sensor comprises an water inflow temperature sensor and/or a water outflow temperature sensor, the water inflow temperature sensor being disposed in the water inflow section, and the water outflow temperature sensor being disposed in the water outflow section, the water inflow temperature sensor and the water outflow temperature sensor enables the controller to intelligently control the opening extent of the gas proportional valve in real time according to the water inflow and/or the water outflow temperature during operation of the device, ensuring that the water outflow temperature reaches a setting temperature; and
a water flow rate regulating valve of a memory alloy type, wherein the water flow rate regulating valve is disposed in the water inflow section for automatically adjusting water flow rate in direct proportion to a change of water inflow temperature.

5. The vehicle-mounted gas-fired water heater according to claim 2, wherein the port comprises a gas vent and an air vent, the gas vent being located at a side of the rectifier, the air vent being located at the bottom and/or side of a gas mixing enhancing seat.

6. The vehicle-mounted gas water heater according to claim 1, wherein the gas valve is a gas proportional valve, the water delivering pipe comprises a water flow sensor, and the controller controls the gas proportional valve based on a temperature signal of the water inflow temperature sensor and/or the water outflow temperature sensor and a water flow signal of the water flow sensor, so that an input heat load of the water heater matches a current water inflow temperature and flow rate to achieve or approach a setting value of an water outflow temperature.

7. The vehicle-mounted gas water heater according to claim 1, further comprising a filtering device for filtering air flowing in from an air inlet of the casing.

8. The vehicle-mounted gas water heater according to claim 1, further comprising a connecting line and a wire controller, an end of the connecting wire being connected to the controller, another end of the connecting wire being drawn out from the casing and connected to the wire controller.

9. A vehicle-mounted gas water heater according to claim 7, wherein the filtering device has a drainage structure for discharging water that has flowed in from the air inlet.

* * * * *